(12) United States Patent
Asao et al.

(10) Patent No.: US 6,246,142 B1
(45) Date of Patent: Jun. 12, 2001

(54) STATOR CORE FOR CAR AC GENERATOR AND PROCESS FOR PRODUCING STATOR CORE FOR CAR AC GENERATOR

(75) Inventors: Yoshihito Asao; Toshiaki Kashihara; Kyoko Higashino; Atsushi Ohashi; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/390,364

(22) Filed: Sep. 7, 1999

(30) Foreign Application Priority Data

Mar. 19, 1999 (JP) ................................................. 11-076612

(51) Int. Cl.[7] .................................................. H02K 15/02
(52) U.S. Cl. .......................... 310/217; 310/42; 310/216; 310/254; 29/596
(58) Field of Search ..................................... 310/258, 259, 310/42, 254, 216, 217, 218; 29/596

(56) References Cited

U.S. PATENT DOCUMENTS

| | | | |
|---|---|---|---|
| 3,842,493 | * | 10/1974 | Ohuchi et al. ......................... 310/42 |
| 4,654,552 | * | 3/1987 | Fritzsche .............................. 310/216 |
| 4,687,960 | * | 8/1987 | Frister .................................... 310/42 |
| 4,912,833 | * | 4/1990 | Fritzsche .............................. 29/596 |

FOREIGN PATENT DOCUMENTS

| | | | |
|---|---|---|---|
| 2 037 093 | 7/1980 | (GB) | ............... H02K/5/15 |
| 54-124845 | 9/1979 | (JP) | ............... B23K/26/00 |
| 62-250845 | 10/1987 | (JP) | ............... H02K/15/02 |
| 1-170346 | 7/1989 | (JP) | ............... H02K/15/02 |
| 10-313556 | 11/1998 | (JP) | ............... H02K/15/02 |

\* cited by examiner

*Primary Examiner*—Burton Mullins
(74) *Attorney, Agent, or Firm*—Sughrue, Mion, Zinn, Macpeak & Seas, PLLC

(57) ABSTRACT

A stator core which joint vibration in a radial direction and can suppress a vibration mode and a production process therefor.

The stator core has a plurality of welded portions formed on the exterior or interior side of the cylinder in the same direction diagonal to the lamination direction of the metal sheet from the upper end to the lower end of the cylinder.

4 Claims, 16 Drawing Sheets

STATOR CORE FOR CAR AC GENERATOR AND PROCESS FOR PRODUCING STATOR CORE FOR CAR AC GENERATOR

BACKGROUND OF THE INVENTION

1. Field of the Invention

The present invention relates to a stator core for an AC generator to be mounted on a vehicle and a production process therefor.

2. Description of the Prior Art

FIG. 7 is a sectional view of a car AC generator of the prior art. This AC generator comprises a case 3 formed by connecting an aluminum front bracket 1 and an aluminum rear bracket 2 by a bolt 3B, a shaft 5 provided in the case 3 and fitted with a pulley 4 for receiving the torque of an engine transmitted from a belt at one end, a random type rotor 6 fixed to the shaft 5, fans 6F fixed to both sides of the rotor 6, a stator 7A fixed on the inner wall of the case 3, slip rings 8, fixed to the other end of the shaft 5, for supplying a current to the rotor 6, a pair of brushes 9 and 9 which slide in contact with the slip rings 8, a brush holder 10 for storing the brushes 9 and 9, a rectifier 11, electrically connected to the stator 7A, for rectifying an AC generated in the stator 7A into a DC, a heat sink 12 attached to the brush holder 10, and a regulator 13, attached to the heat sink 12, for regulating an AC voltage generated in the stator 7A. Denoted by 14a and 14b are bearings, and 15 brackets for connecting the AC generator to the engine.

The above rotor 6 comprises a rotor coil 6A for generating a magnetic flux with a current supplied and a pole core 6B for covering the rotor coil 6A and forming a magnetic pole with the magnetic flux. The pole core 6B consists of a pair of pole core unit 6x and a pole core unit 6y which engage with each other. The pole core units 6x and 6y are made from iron and have claw-like magnetic poles 62 and 62, respectively.

The stator 7A comprises a stator core 17A and a stator coil 17B formed of a conductor wound round the stator core 17A. An AC is generated in the stator coil 17B by the rotation of the rotor 6 according to changes in the magnetic flux from the rotor coil 6A.

In the car AC generator constituted above, a current is supplied to the rotor coil 6A from a battery (unshown) through the brushes 9 and 9 and the slip rings 8 to generate a magnetic flux. Meanwhile, the pulley 4 is driven by the engine and the rotor 6 is turned by the shaft 5, thereby giving a rotating field to the stator coil 17B to generate electromotive force in the stator coil 17B. This AC electromotive force is rectified into a DC by the diodes 16 and 16 of the rectifier 11, the DC is regulated by the regulator 13, and the regulated DC is charged into the battery.

FIG. 8 is a sectional view of a car brushless AC generator of the prior art. The same or corresponding elements as those of FIG. 7 are given the same reference symbols and their descriptions are omitted. In the case of this car brushless AC generator, when the engine is started, an excitation current is supplied from the battery to an excitation coil incorporated in an excitation core 19 through a regulator 13A and the pole core units 6x and 6y of the rotor 6 are turned by the rotation of the shaft 5, whereby electromotive force is generated in the stator coil 17B of the stator 7A. This AC electromotive force is rectified into a DC by the diodes 16 and 16 of the rectifier 11, the DC is regulated by the regulator 13A, and the regulated DC is charged into the battery.

FIG. 9 is a schematic perspective view showing an example of stator core 17A used in the car AC generator of the prior art shown in FIG. 7 and FIG. 8. The stator core 17A having a predetermined thickness S in a lamination direction is constructed by winding a single long iron metal sheet 17a which is punched as shown in FIG. 10 spirally in such a manner that the metal sheet layer are placed one upon another to form a cylinder and welding the cylinder at several locations on the peripheral side of the cylinder in the lamination direction. The metal sheet 17a has recesses 17b for forming slots 20 and recesses 17c for forming bolt shelter grooves 21 after lamination. FIG. 11 is a schematic plan view of the stator core 17A.

In FIG. 9, four welding spots are provided on the peripheral side at intervals of about 90° on the basis of the center of the cylinder. Generally speaking, four welding spots are provided from the view point of the strength of the core assembly. Welding is carried out linearly from the upper end to the lower end of the peripheral side of the cylinder with a jig movable in the lamination direction of the cylinder after the cylinder is sandwiched between chucks to bring the layers of the metal sheet 17a into close contact with one another.

A first-phase coil, a second-phase coil and a third-phase coil are inserted into the respective slots 20 of the stator core 17A shown in FIG. 9 to construct the stator 7A shown in FIG. 12 for inducing a three-phase AC. The coil of each phase is inserted into every three slots. Conductors 17e forming the coil are fixed in each slot 20 with varnish 22 as shown in FIG. 13 and the opening side of the slot 20 is sealed with a resin 23.

By winding the long metal sheet 17a punched as shown in FIG. 10 spirally in such a matter that the metal sheet layers are placed one upon another, a plurality of bolt shelter grooves 21 are formed linearly on the peripheral side of the stator core 17A so that they are continuous in a vertical direction and parallel to the lamination direction of the metal sheet 17a. The bolt shelter grooves 21 are formed at intervals of 10°, for example, on the basis of the center of the stator core 17A.

Besides the above method, the stator core having a predetermined thickness may be constructed by placing a plurality of ring-shaped metal sheets one upon another to form a cylinder and welding the peripheral side of the cylinder at several locations in the same manner as described above.

SUMMARY OF THE INVENTION

According to the above-described stator core 17A of the prior art, the peripheral side of the cylinder is welded linearly (parallel to the above bolt shelter grooves 21) in the lamination direction of the metal sheet continuously from the upper end to the lower end of the cylinder. Therefore, when suction force between the rotor 6 and the stator 7A is applied to the stator core 17A, there arises such a problem that the stator 7A generates a vibration mode in a radial direction as a whole with a linear welded portion serving as a joint as shown in FIG. 14.

Japanese Utility Patent Application No. 53-141410 discloses a stator core 30 in which a non-welded portion 31 is partly formed as shown in FIG. 15. Welded portions which are continuous in a vertical direction are formed at several welding spots on the peripheral side of the stator core 30 having a predetermined thickness S. However, in this stator core 30, welded portions 32 continuous in a vertical direction are concentratedly formed at each welding spot and it cannot be said that the welded portions 32 are scattered in the peripheral direction and vertical direction of the stator core. Therefore, the welded portions 32 serve as joints and a vibration mode is still generated with some joints because the joints do not disappear and a variety of elements are existent in a car generator having a wide range of revolution speed.

As shown in FIG. 16, Japanese Laid-open Patent Application No. 54-124845 discloses a stator core 40 which is produced by forming oblique welded portions 41 on the peripheral side in a zigzag manner. Even in this case, since the upper and lower ends of the welded portion 41 are close to each other, the rigidities of the upper and lower ends of the welded portion 41 are high and joints cannot be eliminated completely. Therefore, a vibration mode is still generated.

It is an object of the present invention to solve the above problem of the prior art to provide a stator core which hardly generates joint vibration in a radial direction and can suppress a vibration mode and a production process therefor.

According to a first aspect of the present invention, there is provided a stator core for a car AC generator, which is formed like a cylinder by winding a metal sheet and which has welded portions for fixing the metal sheet on the exterior side or the interior side of the cylinder, wherein the stator core has a plurality of welded portions formed on the exterior or interior side of the cylinder from the upper end to the lower end of the cylinder in the same direction diagonal to the lamination direction of the metal sheet. The stator core is produced by carrying out welding a plurality of times on the exterior or interior side of the cylinder from the upper end to the lower end of the cylinder in the same direction diagonal to the lamination direction of the metal sheet.

According to another aspect of the present invention, there is provided a stator core in which a plurality of groups of welded portions, each group formed on part of the exterior or interior side of the cylinder from the upper end to the lower end of the cylinder in parallel to the laminating direction of the metal sheet at different locations in a peripheral direction and a vertical direction, are formed on the exterior or interior side of the cylinder in the same direction. This stator core is produced by carrying out welding a plurality of times on part of the exterior or interior side of the cylinder from the upper end to the lower end of the cylinder in parallel to the lamination direction of the metal sheet at different locations in a peripheral direction and a vertical direction and carrying out this set of welding works a plurality of times on the exterior or interior side of the cylinder in the same direction.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS Embodiment 1

A stator core according to Embodiment 1 of the present invention has a plurality of welded portions formed on the peripheral side of a cylinder from the upper end to the lower end of the cylinder in the same direction diagonal to the lamination direction of a metal sheet. That is, this stator core is produced by carrying out a plurality of welding works on the peripheral side of the cylinder in the same direction diagonal to the lamination direction of the metal sheet.

Example 1

Figure 1:
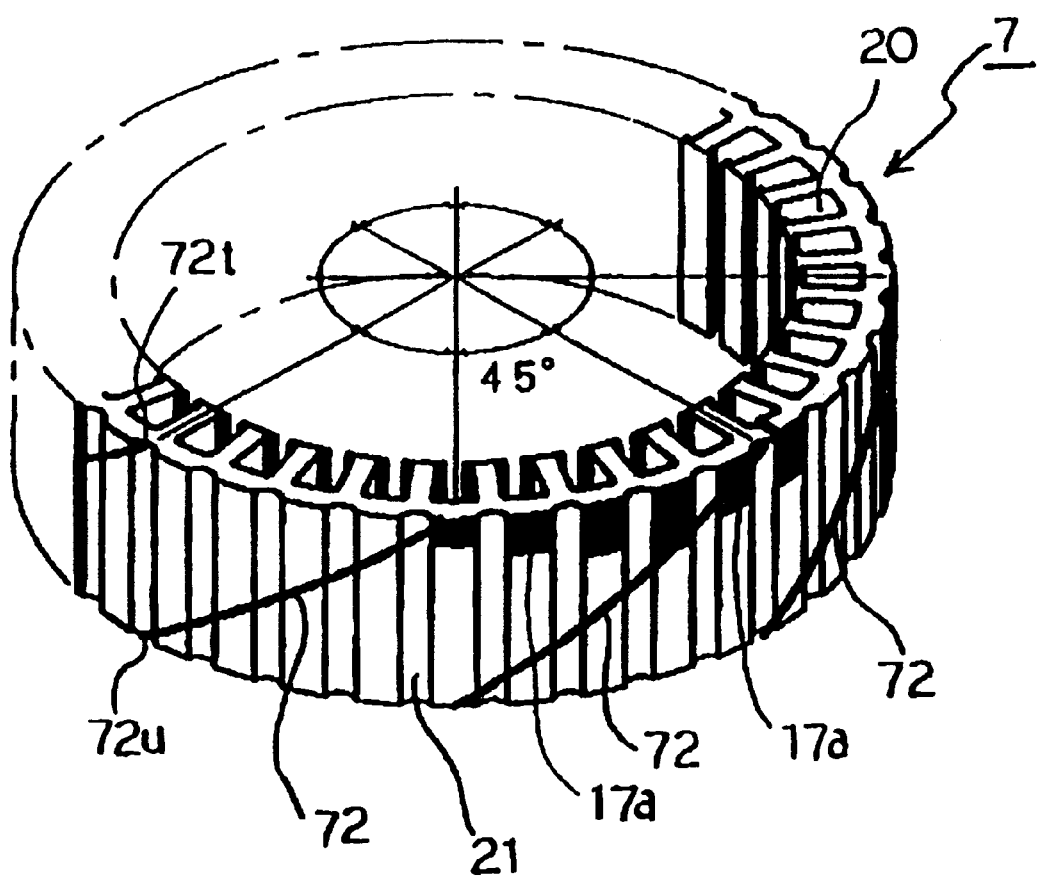
FIG. 1 is a schematic perspective view of a core structure forming the stator core of Example 1 according to Embodiment 1 of the preset invention.
Figure 9:
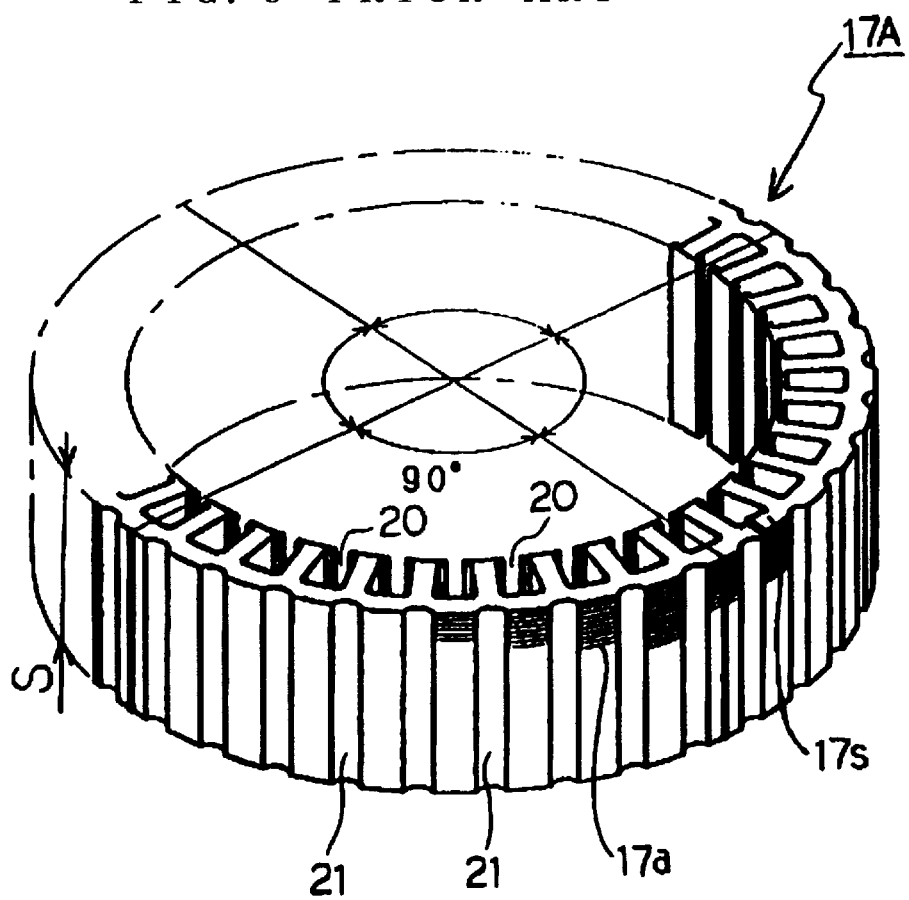
FIG. 9 is a schematic perspective view showing an example of stator core of the prior art.
Figure 10:
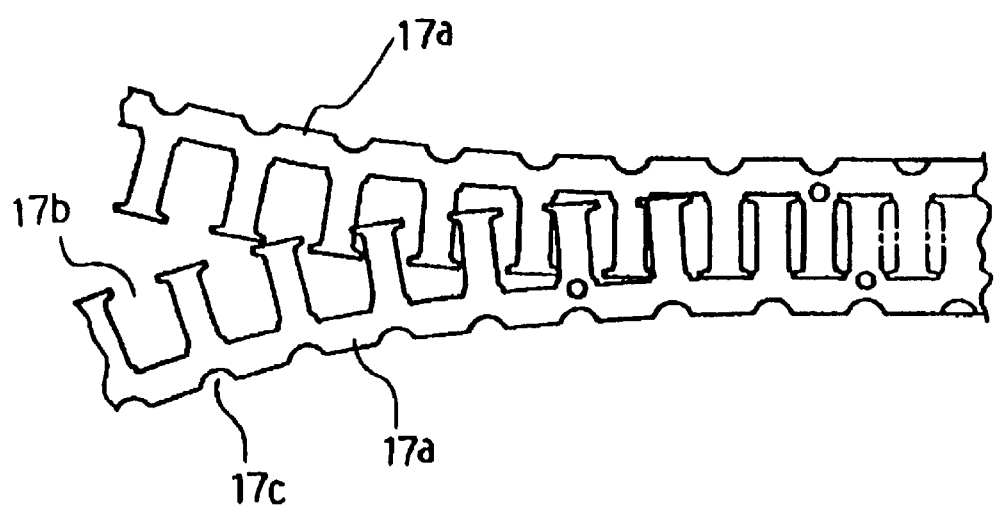
FIG. 10 is a diagram showing a metal sheet forming the stator core of the prior art.
Figure 11:
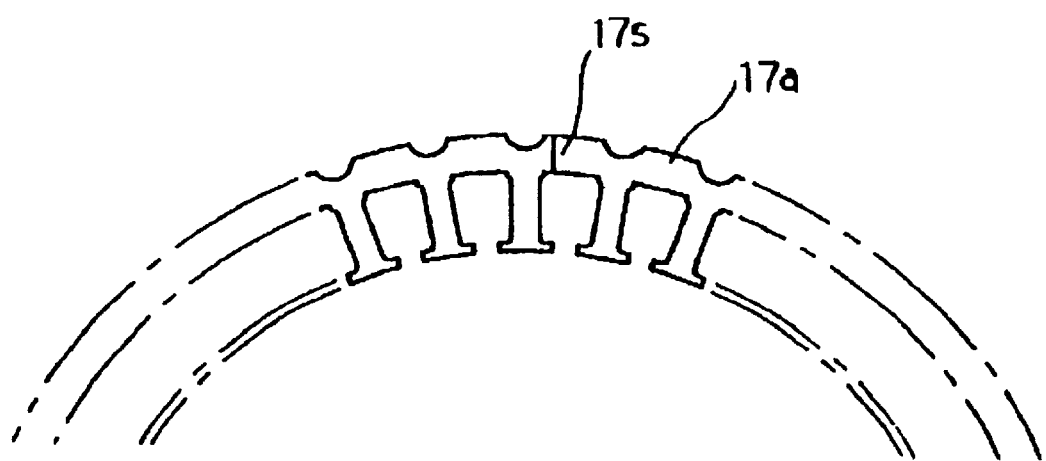
FIG. 11 is a schematic plan view of the stator core of the prior art.
Figure 12:
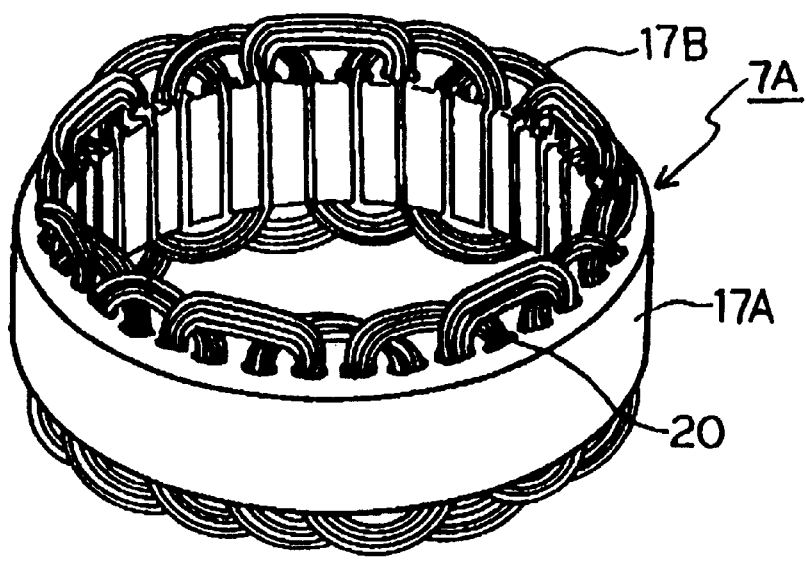
FIG. 12 is a perspective view showing another example of stator core of the prior art.
Figure 13:
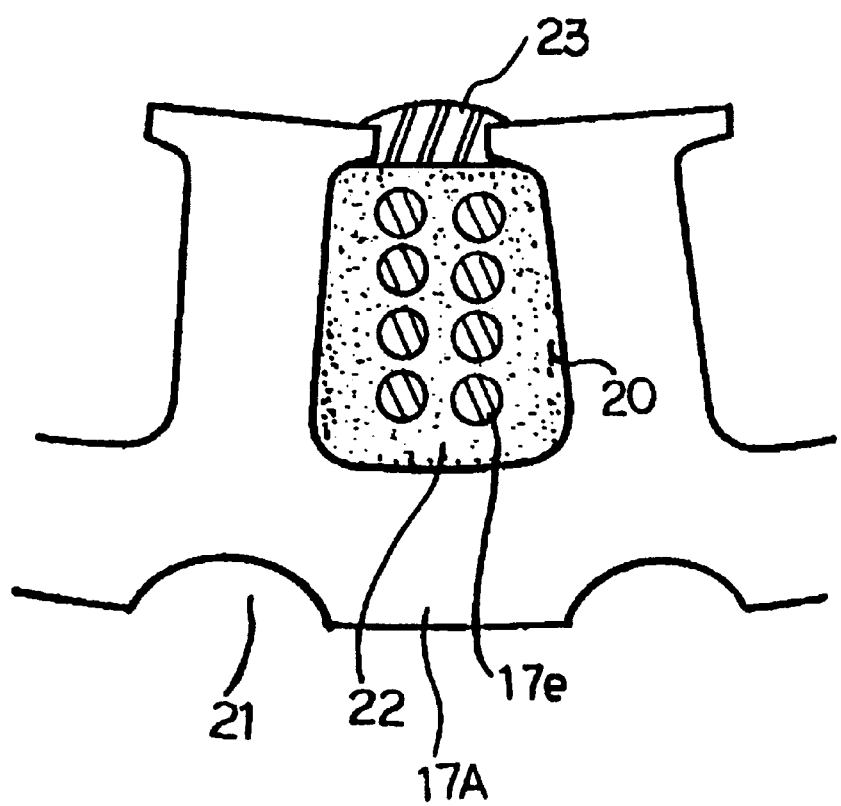
FIG. 13 is a partial sectional view showing the relationship between a coil conductor and a slot.
Figure 14:
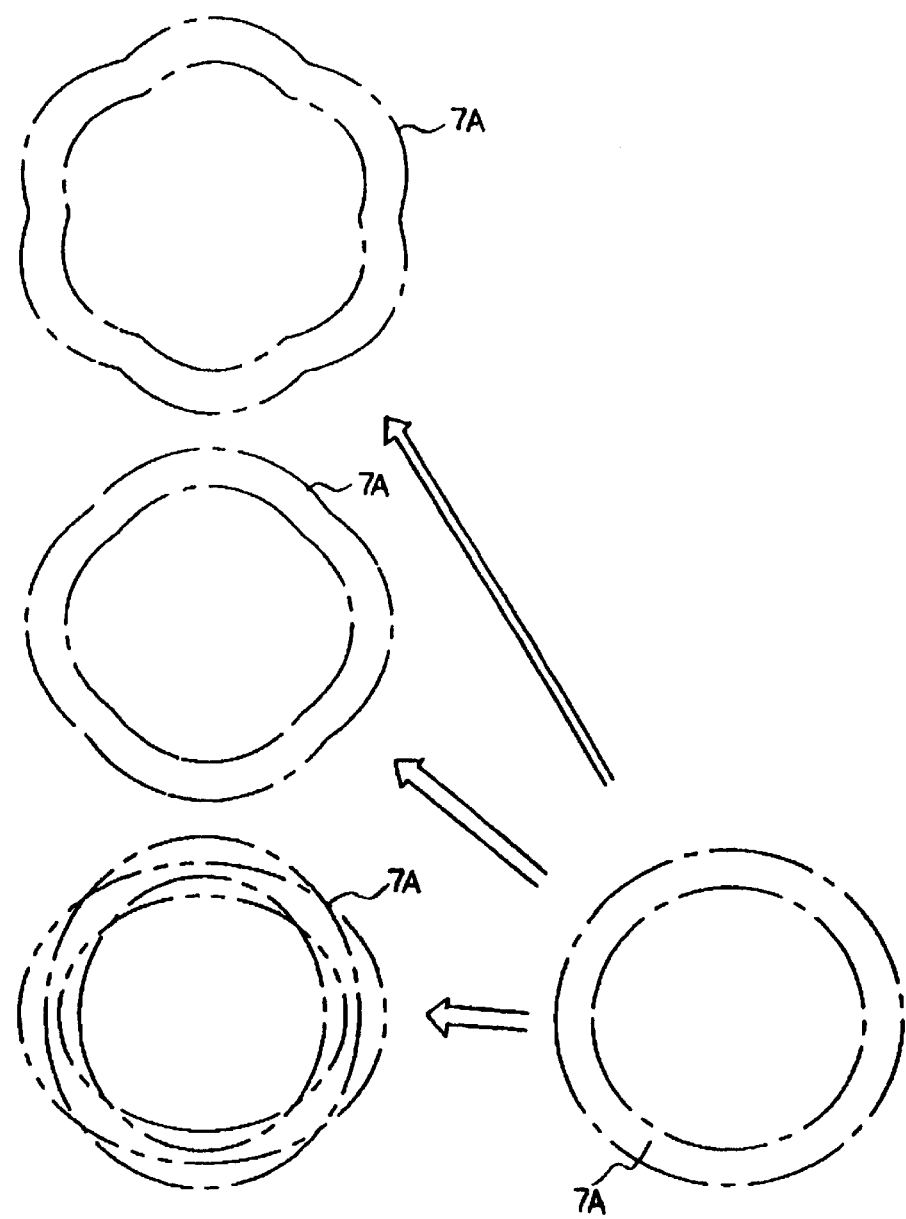
FIG. 14 is a diagram for expelling the problem of the prior art.
Figure 15:
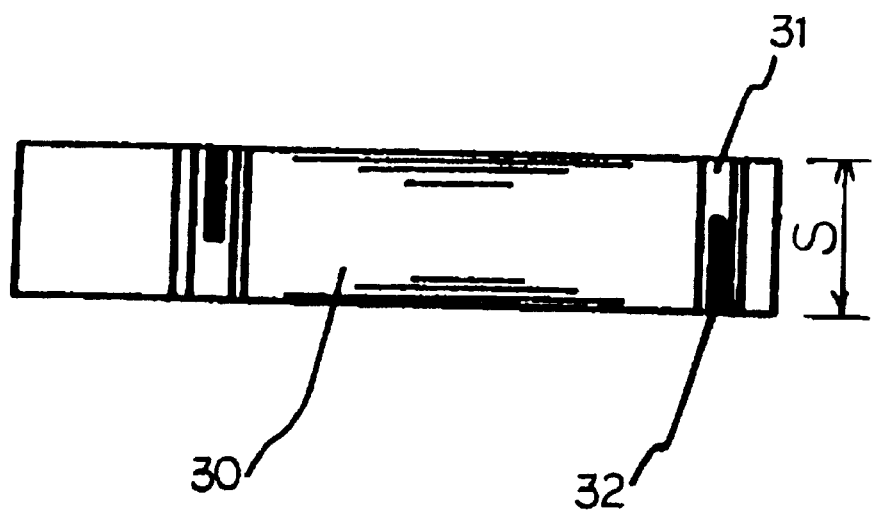
FIG. 15 is a side view showing another example of stator core of The prior art.
Figure 16:
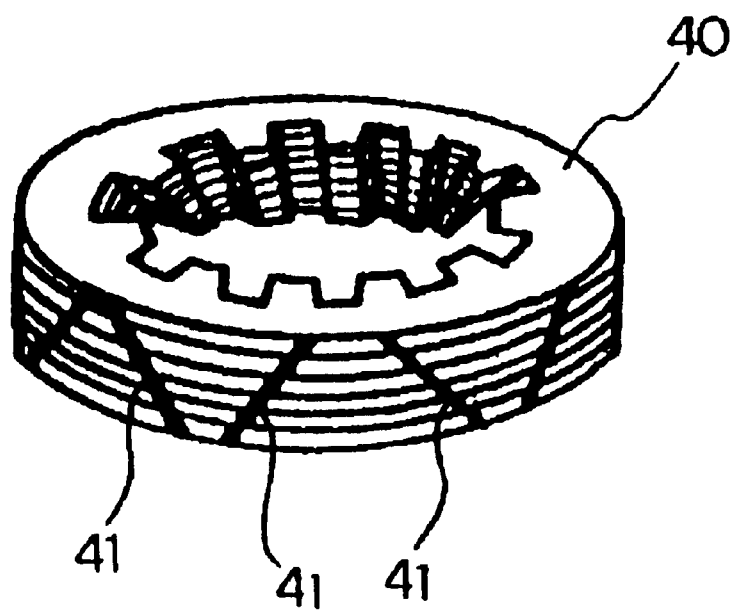
FIG. 16 is a perspective view showing still another example of stator coil of the prior art.

FIG. 1 is a schematic perspective view of a stator core 7 having a plurality of welded portions formed on the peripheral side of a cylinder from the upper end to the lower end of the cylinder in the same direction diagonal to the lamination direction of a metal sheet 17a. The same or corresponding elements as those of the prior art of FIG. 9 are given the same reference symbols.

In this Example 1, since the upper ends 72t of the welded portions 72 are spaced apart from one another at intervals of 45° on the basis of the center of the cylinder, eight welded portions are formed on the peripheral side of the cylinder in the same direction diagonal to the lamination direction of the metal sheet 17a. The upper end 72t and the lower end 72u of adjacent welded portions 72 are aligned with each other in a peripheral direction.

Welding may be carried out with a welding jig movable in the lamination direction of the cylinder while the cylinder is rotated after the cylinder is sandwiched between chucks so that the metal sheet layers 17a are brought into close contact with one another.

When the electromagnetic noise of a generator comprising the stator core 7 of the above Example 1 is measured and compared with the electromagnetic noise of a generator comprising the stator core 17A of the prior art, the peak value of an unpleasant high-frequency element lowers. Thus, the effect of reducing the electromagnetic noise is obtained. Since a characteristic frequency with which the stator itself resonates mainly consists of 30 elements or 36 elements, the effect of the stator core 7 for each of the elements is shown in FIG. 2 and FIG. 3.

Figure 2:
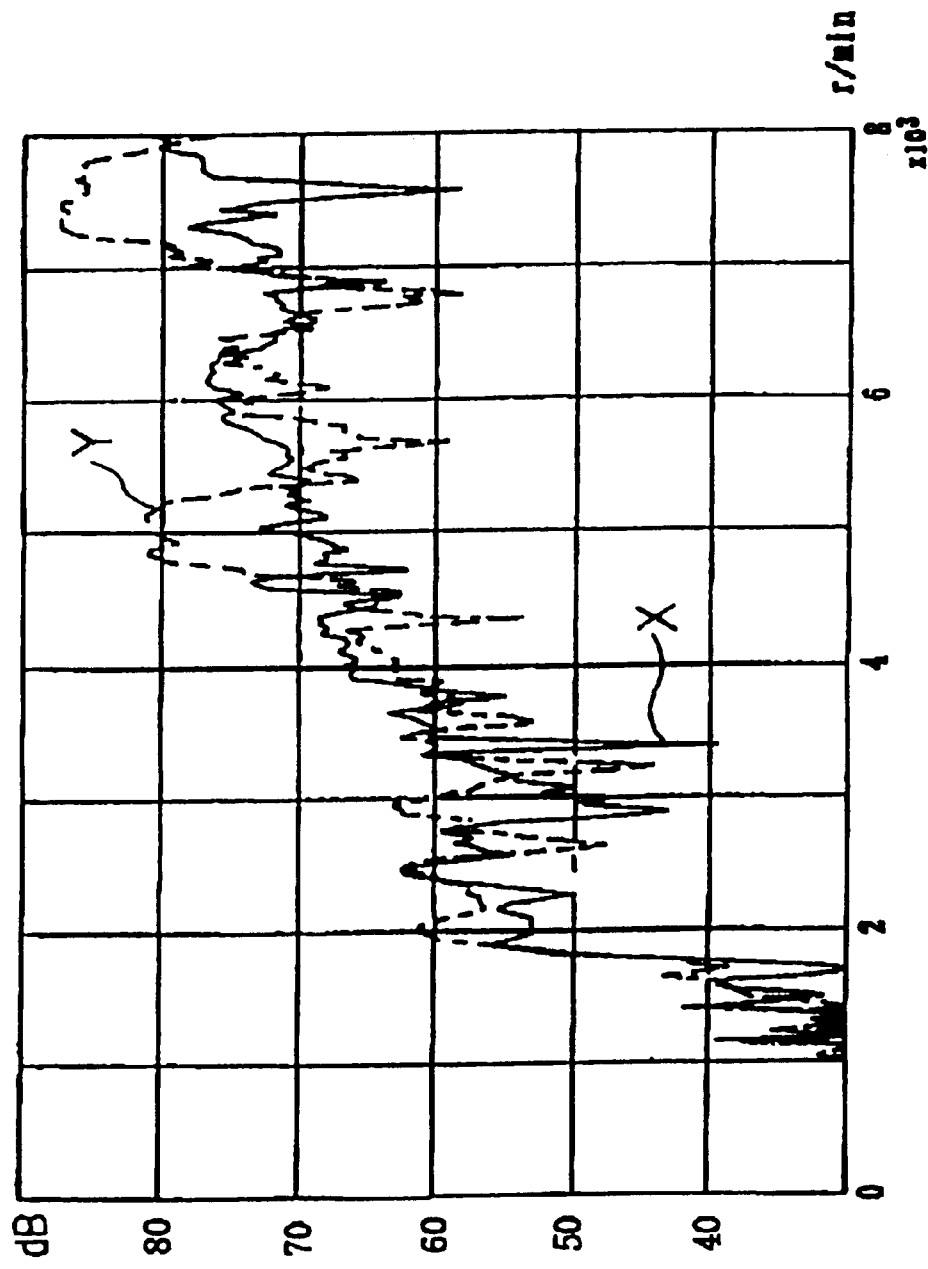
FIG. 2 is a diagram showing the effect of the stator core of Example 1.

FIG. 2 shows the comparison result of a 30-element frequency. A solid line X indicates the level of the 30-element electromagnetic noise of the generator comprising the stator core 7 of Embodiment 1 and a broken line Y indicates the level of the 30-element electromagnetic noise of the generator comprising the stator core 17A of the prior art. It is seen from FIG. 2 that the level (dB) of the 30-element electromagnetic noise $(3400(\pm\alpha)\times1/60\times30$ (Hz)) when the rotor turns about 3,400 times or the level of the 30-element electromagnetic noise when the rotor turns about 7,600 times is markedly lower than that of the prior art.

Figure 3:
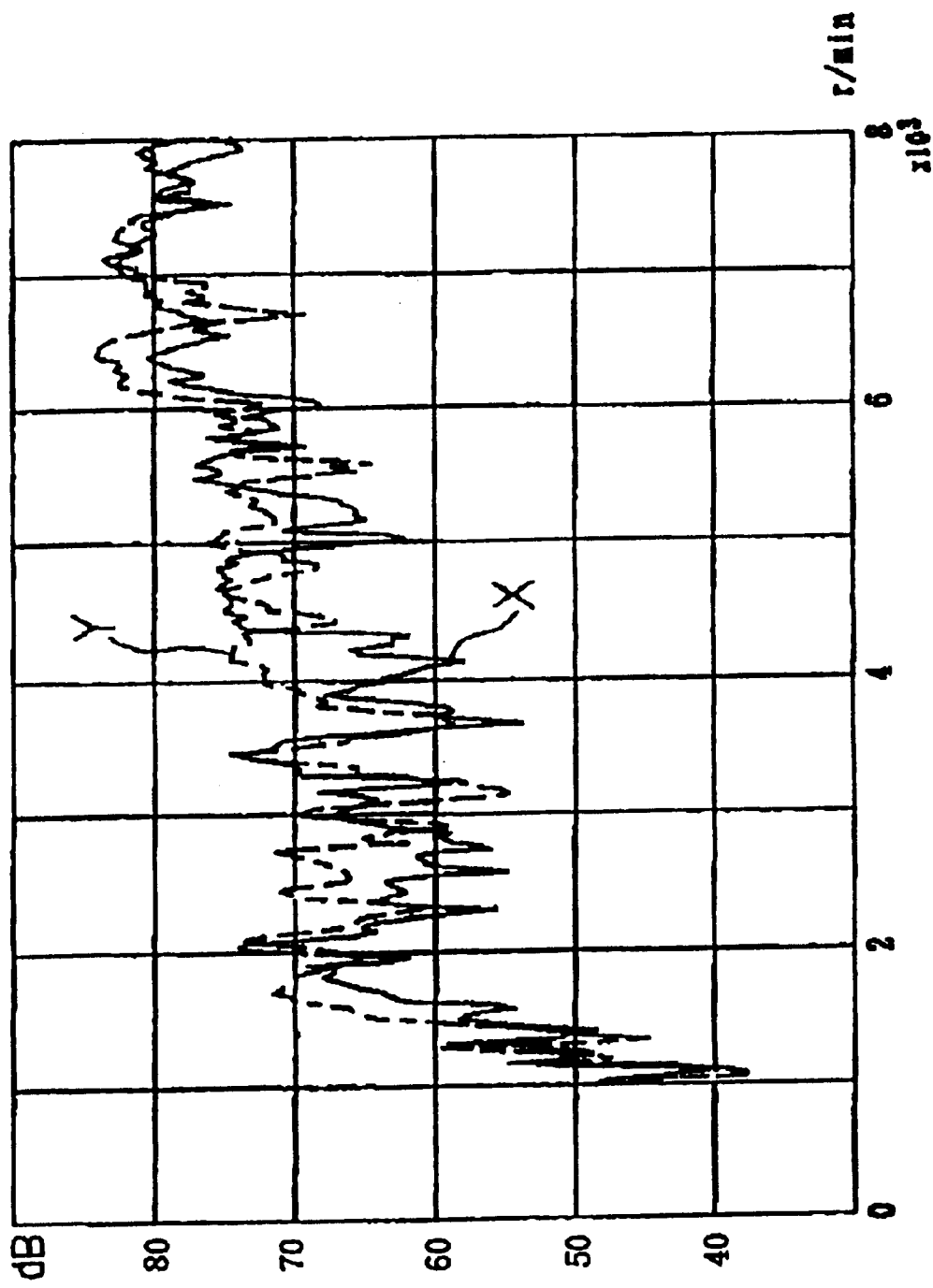
FIG. 3 is a diagram showing the effect of the stator core of Example 1.

FIG. 3 is the comparison result of 36-element electromagnetic noise. A solid line X indicates the level of the 36-element electromagnetic noise of the generator comprising the stator core 7 of Embodiment 1 and a broken line Y indicates the level of the 36-element electromagnetic noise of the generator comprising the stator core 7A of the prior art. It is seen from FIG. 3 that the level of the 36-element electromagnetic noise is almost totally lower than that of the prior art. It is also understood that the level of the 36-element electromagnetic noise when the rotor turns about 4,000 times is markedly lower than that of the prior art.

Therefore, according to the stator core 7 of Example 1, it is seen that the joint of vibration in a radial direction is hardly generated and that a vibration mode can be suppressed.

According to the stator core of Example 1, as welded portions having high rigidity are scattered at random in a lamination direction (the vertical direction of FIG. 1 or a shaft direction when the stator core is installed in the generator) and a peripheral direction, a stator core 7 which hardly generates the joint of vibration in a radial direction and can suppress a vibration mode can be obtained.

According to a process for producing the stator core of Example 1, the stator core 7 having the above effect can be produced.

Example 2

Figure 4:
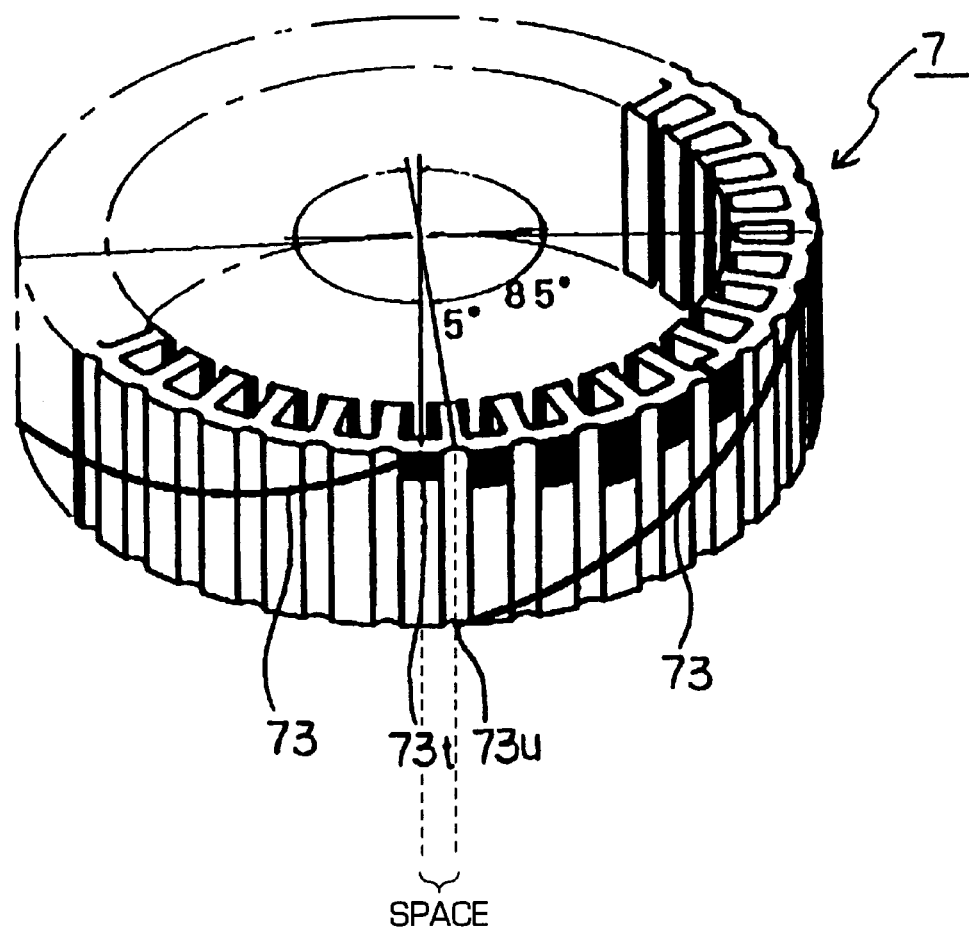
FIG. 4 is a schematic perspective view of the stator core of Example 2 according to Embodiment 1 of the present invention.

In Example 1, eight welded portions 72 are formed at intervals of 45° on the basis of the center of the cylinder. In this Example, as shown in FIG. 4, diagonal welded portions 73 are formed at intervals of 85° on the basis of the center of the cylinder, and a space having an angle of 5° is formed in a peripheral direction between the upper end 73t and the lower end 73u of adjacent welded portions 73. In this case, four welded portions 73 are formed in the same direction diagonal to the lamination direction of the metal sheet 17a. The welding method of Example 2 is the same as that of Example 1.

In this Example 2, the space is formed in the peripheral direction between the upper end 73t and the lower end 73u of adjacent welded portions 73. In other words, the upper end 73t and the lower end 73ud of adjacent welded portions 73 do not overlap with each other in the lamination direction, thereby making it possible to make more difficult the generation of the joint of vibration in a radial direction than in Example 1.

Figure 5:
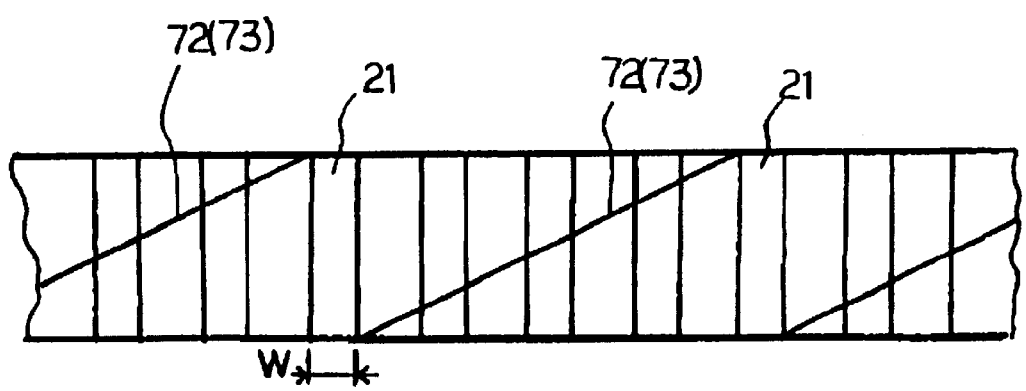
FIG. 5 is a schematic perspective view of the stator core of Example 3 according to Embodiment 1 of the present invention.

The welded portions of Example 1 and Example 2 are formed along diagonal straight lines as shown in FIG. 5 when they are developed.

Example 3

When the width W of one or more of the bolt shelter grooves 21 is used as the space in Example 2 as shown in FIG. 5, the following effect is obtained in addition to the effect of Example 2. That is, when the bolt shelter groove 21 is welded, there is a possibility that a filling may interfere with the connection of the front bracket 1 and the rear bracket 2 by the bolt 3B. Therefore, the filling must be cut off in a case. Therefore, if the bolt shelter groove 21 between the welded portion 72 (73) and the welded portion 72 (73) is not welded by using the width W of one or more of the bolt shelter grooves 21 as the space, the above cutting work can be eliminated.

Embodiment 2

In the above Embodiment 1, welding is carried out obliquely and continuously. Welding may be carried out a plurality of times on part of the peripheral side of the cylinder from the upper end to the lower end of the cylinder in a direction parallel to the lamination direction of the metal sheet at different locations in a peripheral direction and a vertical direction. A set of these welding works may be carried out a plurality of times on the peripheral side of the cylinder in the same direction.

Embodiment 2 will be described herein under with reference to FIG. 6.

Figure 6:
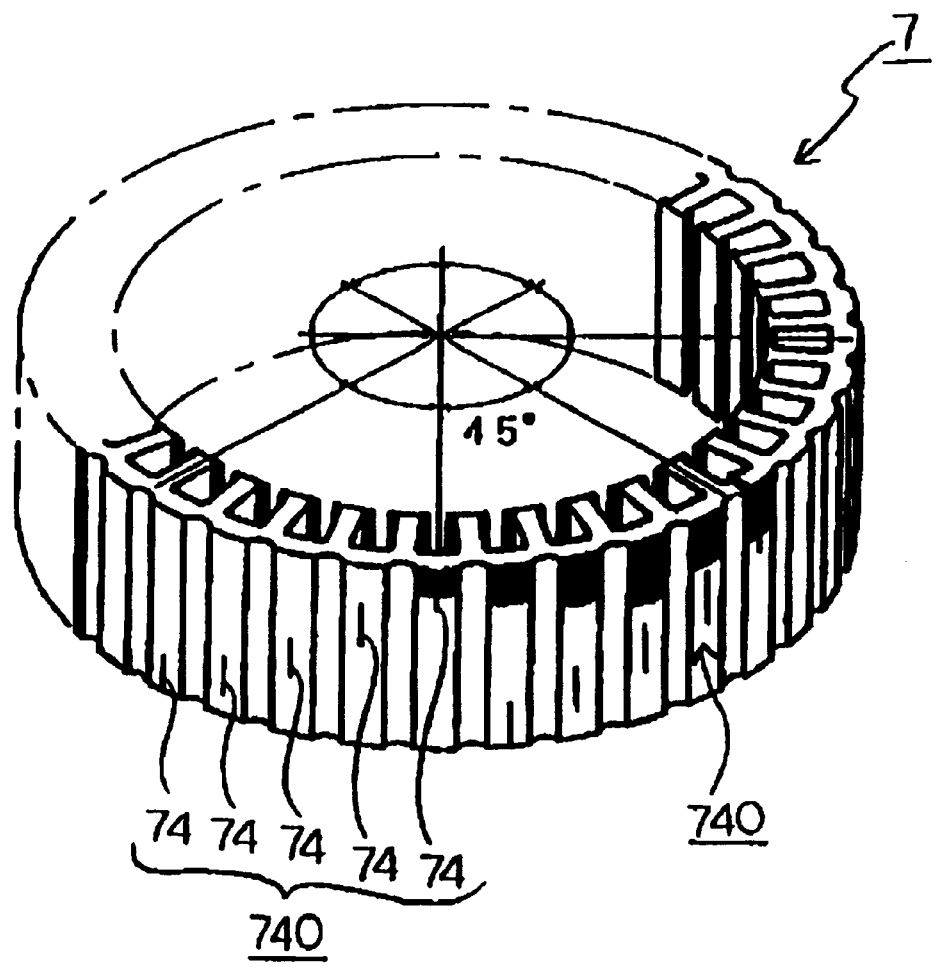
FIG. 6 is a schematic perspective view of a stator core according to Embodiment 2 of the present invention.
Figure 7:
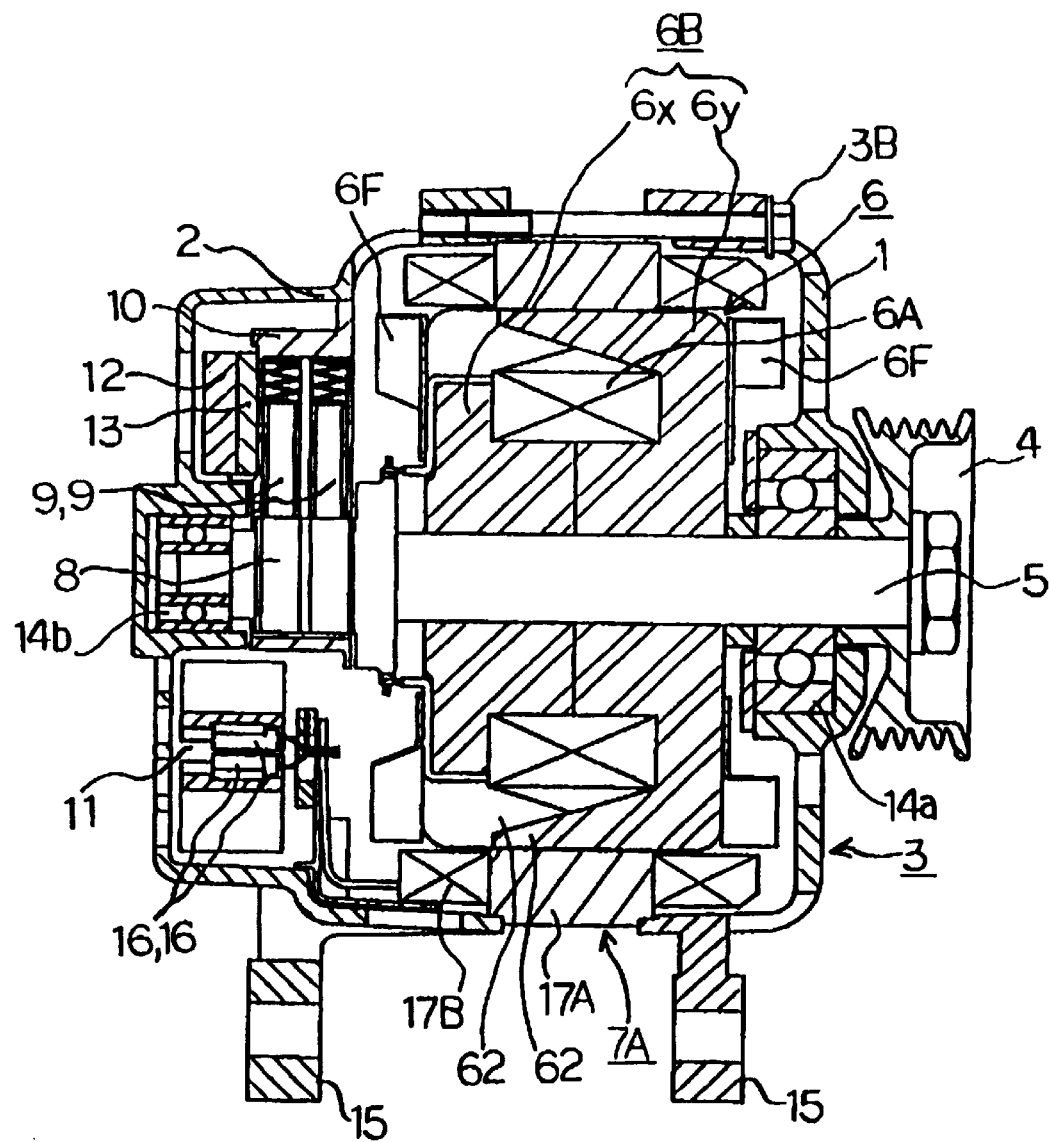
FIG. 7 is a sectional view of a car AC generator of the prior art.
Figure 8:
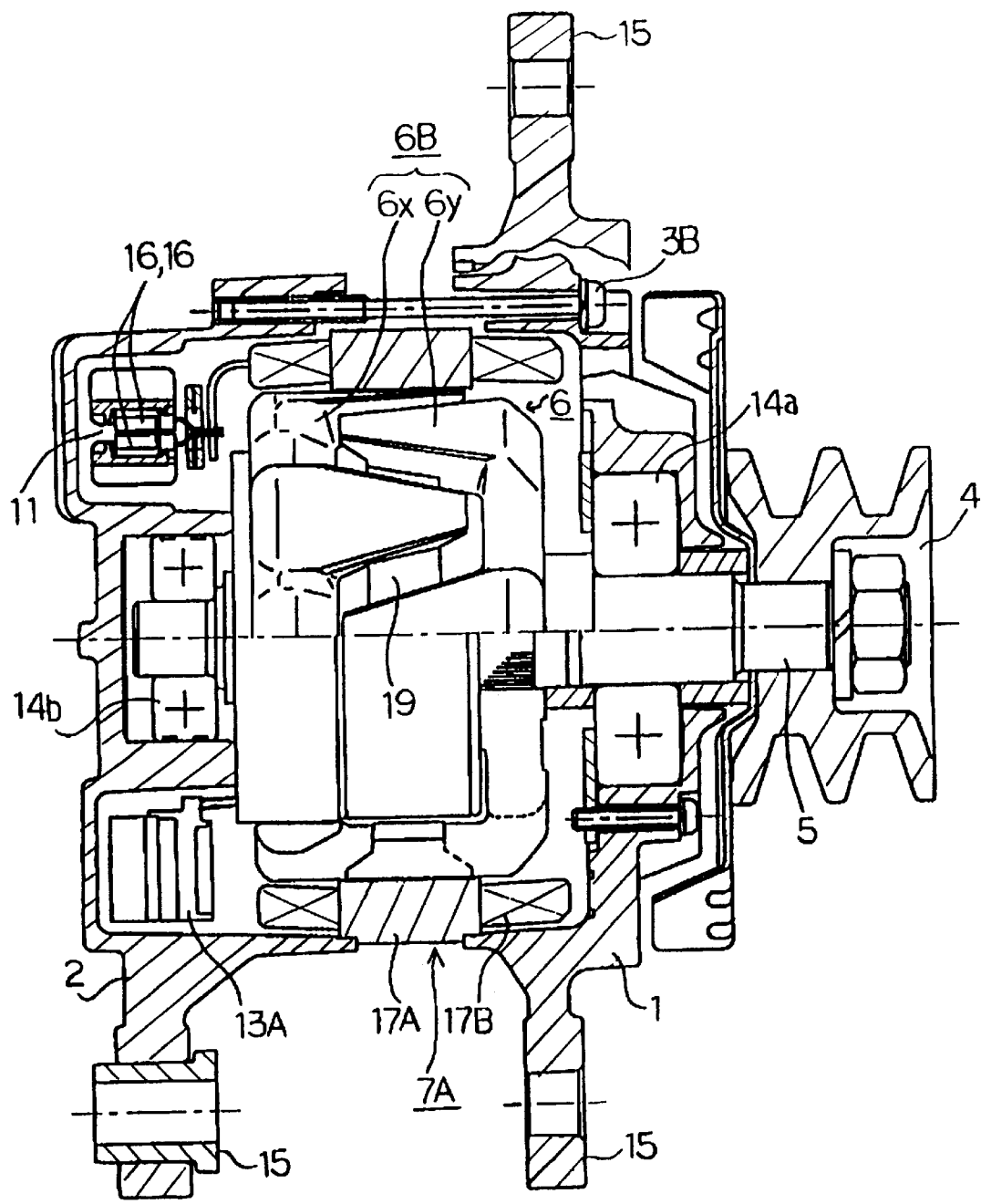
FIG. 8 is a sectional view of a car brushless AC generator of the prior art.

In FIG. 6, eight groups 740 of welded portions 74 formed from the upper end to the lower end of the cylinder are formed on the peripheral side of the cylinder at intervals of about 45° on the basis of the center of the cylinder.

Each group 740 consists of welded portions 74 formed in parallel to the lamination direction of the metal sheet 17a at different locations in a peripheral direction and a vertical direction. The group 740 can be formed by carrying out the above welding work 8 times in the same direction diagonal to the lamination direction of the metal sheet. As a result, the stator core 7 has eight groups 74 of welded portions 74 formed on the peripheral side of the cylinder in the same direction, the welded portions 74 of each group formed on part of the peripheral side of the cylinder from the upper end to the lower end of the cylinder in parallel to the lamination direction of the metal sheet 17a at different locations in a peripheral direction and a vertical direction.

The groups 740 are formed such that they do not overlap with one another in the lamination direction. The upper end and the lower end of adjacent welded portions 74 are slightly overlapped with each other in a peripheral direction.

In the stator core and the production process of Embodiment 2, since welded portions having high rigidity are scattered at random in a lamination direction and a peripheral direction, the same effect as that of Embodiment 1 can be obtained.

It is desired that the groups 740 should not overlap with one another in a lamination direction but the upper end and the lower end of adjacent welded groups 740 may be aligned with each other in a peripheral direction.

In the above embodiments, the welded portions 72, the welded portions 74 and the groups 740 are formed in parallel to one another at equal intervals. However, they do not need to be formed in parallel to one another at equal intervals but may be formed in the same direction.

The number of the welded portions 72, the number of the welded portions 74 and the number of the groups 740 are generally 3 to 4.

Welding may be carried out on the interior side of the cylinder.

In each of the above embodiments, the long metal sheet 17a is wound spirally so that the metal sheet layers are placed one upon another to form the cylinder. It is needless to say that the present invention can be applied to the case where a plurality of ring-shaped metal sheets are placed one upon another to form the cylinder.

As described above, according to the present invention, there can be obtained a stator core which hardly generates the joint of vibration in a radial direction and can suppress a vibration mode.

What is claimed is:

1. A stator core for a car AC generator, which is formed as a cylinder by winding a metal sheet such that the metal sheet layers are placed one upon another and which are welded together, wherein the stator core is welded together with a plurality of welded portions each formed on a periphery of the cylinder from an upper end to a lower end of the cylinder, and wherein said welded portions are all in the same direction, and in a direction diagonal to a lamination direction of the metal sheet, wherein a space is formed between an upper end of each of said welded portions and a lower end of an adjacent one of said welded portions.

2. The stator core for a car AC generator of claim 1, wherein at least one unwelded bolt shelter grove is formed in the space in a vertical direction.

3. A stator core for a car AC generator, which is formed by winding a metal sheet such that the metal sheet layers are placed one upon another and welded together to form a cylinder, wherein said cylinder is welded together by a plurality of groups of welded portions, each group formed on a periphery of the cylinder from an upper end to a lower end of the cylinder, wherein each welded portion of said plurality of groups is parallel to a lamination direction of the metal sheet at different locations progressing from said upper end to said lower end, wherein a space is formed between an upper end of a group of welded portions and a lower end of an adjacent one of said welded portions.

4. The stator core for a car AC generator of claim 3, wherein a plurality of bolt shelter grooves, which are formed in a vertical direction on the peripheral side of the cylinder, are not welded.

* * * * *